United States Patent
Neill et al.

[11] 3,761,123
[45] Sept. 25, 1973

[54] FLOW CONTROL OF TILT CAB IN FREE FALL

[75] Inventors: William T. Neill, Brookfield; Roy Reynolds, Milwaukee, both of Wis.

[73] Assignee: Applied Power Industries, Inc., Milwaukee, Wis.

[22] Filed: Dec. 10, 1971

[21] Appl. No.: 206,777

[52] U.S. Cl. ............... 296/28 C, 91/452, 180/89 A
[51] Int. Cl. ............................................. B62d 33/06
[58] Field of Search ...................... 296/28 C, 35 R; 180/89; 254/124, 93; 91/452, 420

[56] References Cited
UNITED STATES PATENTS

| | | | |
|---|---|---|---|
| 3,523,490 | 8/1970 | Bianchetta | 91/420 |
| 2,291,881 | 8/1942 | Coffey | 91/452 |
| 2,377,278 | 5/1945 | Stephens | 91/452 |
| 3,472,547 | 10/1969 | London | 180/89 X |

*Primary Examiner*—Benjamin Hersh
*Assistant Examiner*—John A. Pekar
*Attorney*—John J. Byrne

[57] ABSTRACT

In a tilting cab vehicle, a hydraulic system for raising and lowering the cab and employing a fluid-flow responsive restricter in the return line and separate from the main directional control valve for restricting fluid flow when the cab is in a free-fall condition.

3 Claims, 2 Drawing Figures

FLOW CONTROL OF TILT CAB IN FREE FALL

This invention relates generally to a motor vehicle and more particularly to a truck havnng an over-the-engine cab which is tiltably mounted on the chassis of the truck for movement between a fully seated position to a fully raised position thereby exposing the engine beneath the cab.

Generally the power system used to raise a tilting cab employs a hydraulic piston and cylinder assembly with one end being attachd to the chassis and the other end attached to the cab. When the cylinder is in the retracted position, the cab is in the normal seated or at rest, position. When the cylinder is extended, the cab is moved through an angle of approximately 90° to the raised position exposing the engine therebeneath. The cab is moved through the over-the-center position such that during approximately the first 45° of movement, the weight of the cab exerts a force tending to nest the piston within the cylinder. As the cab proceeds beyond the over-the-center position, it exerts a pulling force on the piston and the piston rod tending to fully extend the cylinder. In other words, when the cab is moved past the over-the-center position, it is in a free-fall condition, and unless some means is provided to retard its movement, the cab is free to fall at unrestricted speeds causing damage to the cab and possibly causing personal injury.

In many prior art devices, a directional flow control valve is positioned between the pump and reservoir on one side and the cylinder on the other and is provided with an integrally formed metering orific or the like to restrict the flow of fluid from the cylinder during a free-fall condition thereby retarding the movement of the cab preventing damage thereto. This is objectionable in that, generally, the pump input to the cylinder also must pass through a restriction thereby delaying the tilting of the cab and rendering the operation of the entire system less efficient.

A still further objection to the prior art systems, employing fixed orifices in the directional flow control valve, is that even during the initial raising of the cab, for example, prior to the time it reaches the free-fall condition, the flow from the chamber being exhausted in the cylinder is restricted. However, such restriction is not then necessary because the cab is not yet in free-fall condition.

It is an objective of this invention to overcome the abovementioned deficiencies in the prior art devices by providlng a hydraulic system for tiltable ab vehicles which employs a conventional, four-way, directional flow control valve and a separate flow restricter in the return line between the valve and the reservoir which is responsive to the rate of fluid flow such that the fluid flow from the cylinder chamber being exhausted is substantially at full flow until the cab reaches the over-the-center or free-fall position whereupon the restricter senses the increase ln fluid flow and then operates to retard the free-fall movement of the cab. The fluid flow from the pump to the cylinder is unrestricted at all times.

These and other objects of the invention will become more apparent to those skilled in the art by reference to the following detailed description when viewed in light of the accompanying drawings wherein.

Figure 1:
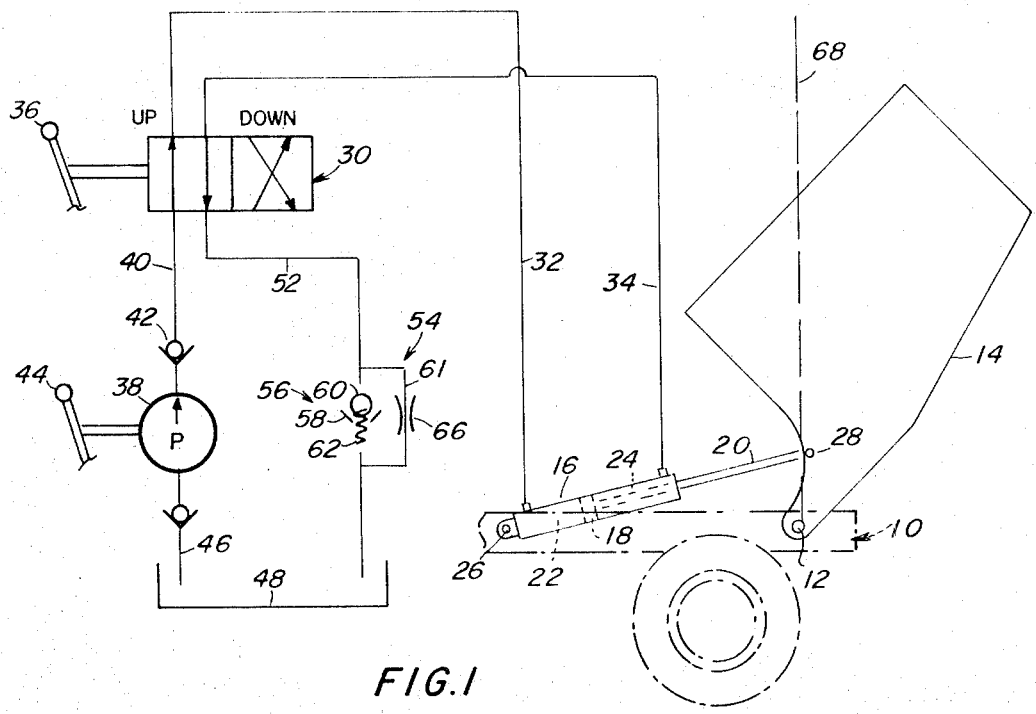
FIG. 1 is a diagrammatic illustration of the system of this invention.

Referring now to FIG. 1 wherein like numerals indicate like parts, the numeral 10 indicates a longitudinal vehicle motor chassis shown in dotted lines. Pivotally attached to the chassis at 12 is a tilting over-the-engine cab 14 well known in the art. The hydraulic power system for raising or tilting the cab includes a hydraulic cylinder 16 reciprocally receiving a piston 18 having a piston rod 20 attached thereto and extending exteriorly of the cylinder 16. The piston 18 divides the cylinder 16 into chambes 22 and 24. The cylinder is pivotally attached at the closed end to the chassis 10 at 26 and the rod 20 is pivotally attached to the cab at 28. The chambers 22 and 24 of the cylinder 16 are connected to a four-way directional flow control valve 30 by means of inlet-outlet conduits 32 and 34 respectively. The valve 30 is conventional in the art and includes an actuating lever 36 for shifting the valves between the up and down positions. The valve as shown in FIG. 1 is in the up position.

A fixed-displacement pump 38 is connected to valve 30 via output conduit 40 having check valve 42 positiond therein. The pump 38 is manually operated by means of lever 44 and is conventional in the art. Intake conduit 46 communicates with reservoir 48 and includes check valve 50 therein to prevent return flow to the reservoir from the pump. The return line 52 connects the valve 30 with the reservoir 48 and includes therein a pressure compensated flow restricter designated by the numeral 54. The flow controller 54 includes a velocity fuse 56 in line 52. The velocity fuse includes a valve seat 58 and a ball 60 normally held off the valve seat by spring 62. The ball 60 will seat on valve seat 58 thereby blocking fluid flow in line 52 when the fluid flow therein reaches a predetermined level. A bypass conduit 64 is communicated with the return conduit 52 on each side of the velocity fuse 56 whereby when the fluid flow and return line 52 reaches such a level as to seat ball 60 thereby blocking fluid flow in 52, the fluid will pass through bypass conduit 64 and fixed restricted orifice 66 and will then be reintroduced to line 52.

In operation, assuming the valve to be in the position as shown in FIG. 1, the pump 38 is actuated to force fluid into chamber 22 of cylinder 16 thereby causing the piston 18 and piston 20 to extend to raise the cab 14. The cylnder will move the cab through an angle of approximately 90° from a fully seated position to a fuly raised or fully tilted position. During the first 45° of movement, the weight of the cab exerts a foce tending to nest the piston within the cylinder 16. As the cab reaches and passes the 45° position inicated by the numeral 68, which generally approximates the ceter-of-gravity position of the cab, the cab will begin to fall forwardly tending to pull the piston 18 from the cylinder 16. Prior to this time, the fluid exiting from chamber 24 is substantially unimpeded in that the flow rate is not sufficient to seat the velociy fuse 20. In other words, the exhaust of chamber 24 is in a full-flow condition. When the cab moves past the over-the-center position and is in free-fall condition, the rate of fluid flow from chamber 24 increases drastically and sufficiently to seat ball 60 thereby shunting the flow through bypass conduit 64 and restricter 66 thereby reducing the flow rate and retarding the outward movement of the piston 18 and the downward movement of cab 14. It is to be understood that the pressure compensate flow restricter operates in the same manner when the valve 30 is shifted to the DOWN position to move the cab back to its normal at rest condition. Further, it is noted that for both the UP function and the DOWN function, the output of pump 38 is unrestricted and at full flow to either of the chambers 22 or 24.

Figure 2:
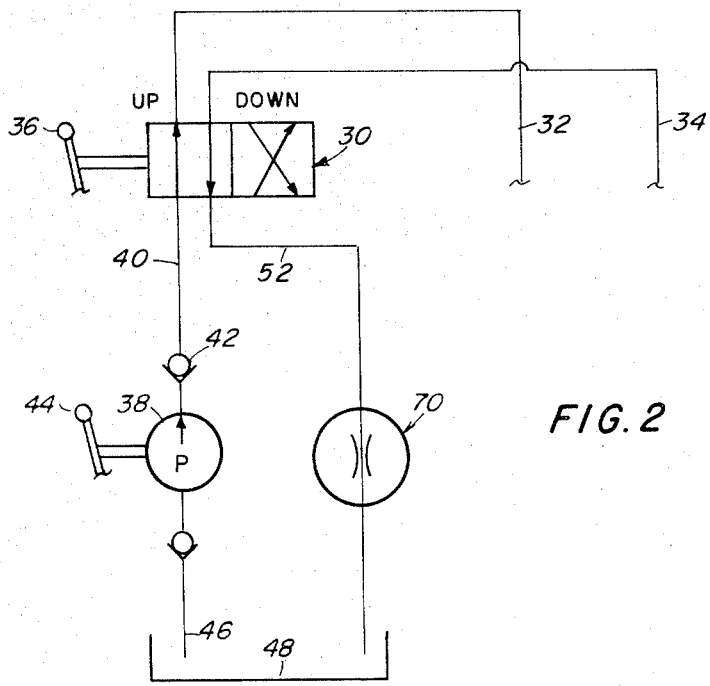
FIG. 2 is a diagrammatic illustratlon of a modified form of the system of this invention.

The embodiment of FIG. 2 is substantially identical to that of FIG. 1 with the exception that the flow restricter 70 is a pressure-compensated flow-control valve instead of a velocity fuse and bypass with a fixed orifce in the bypass. In a general manner, while there has been disclosed effective and efficient embodiments of the invention, it should be well understood that the invention is not limited to such embodiments as there might be changes made in the arrangement, disposition, and form of the parts without departing from the principle of the present invention as comprehended within the scope of the accompanying claims.

We claim:

1. A motor vehicle having an elongated frame, a cab, means pivotally mounted said cab on said frame about an axis transverse to the longitudinal axis of said frame, a double-acting piston and cylinder assembly having one end connected to said frame and another end connected to said cab for moving said cab from a first, normally lowered position, to a second partially raised, 45° position, and to a third, fully raised, 90° forwardly tilted position, said cab by the weight thereof urging said piston and cylinder to expand when between said second and third positions, said piston dividing said cylinder into first and second chambers, a pump, a reservoir, a directional flow control valve, first conduit means connecting the chambers of said cylinder to one side of said valve, and second conduit means connecting said pump and said reservoir to the other side of said valve, said second conduit means comprising an output conduit between said valve and said pump and a return conduit between said reservoir and said valve, a flow restricter in said return conduit responsive to predetermined increases in fluid flow to restrict the fluid flow in said return conduit, means for actuating said valve to selectively communicate said chambers to said output conduit and said return conduit.

2. The motor vehicle of claim 1 wherein said first conduit means comprises a pair of inlet-outlet conduits connecting said valve to said cylinder, first and second chambers respectively, and said flow restricter comprises a pressure-compensated flow control valve.

3. The motor vehicle of claim 1 wherein said first conduit means comprises a pair of inlet-outlet conduits connecting said valve to said first and second chambers respectively, and wherein said flow restricter comprises a velocity valve in said return conduit, a bypass conduit joining the return conduit on each side of said velocity valve, a fixed orifice in said bypass conduit, said velocity valve normally being maintained in the open positon against fluid flow tending to seat the valve, whereby when said fluid flow reaches said predetermined level, the velocity valve will seat to close said return conduit and forcing said flow through said bypass and said orifice.

* * * * *